April 13, 1926. 1,580,401
J. B. BORGADT
ELECTRIC WELDING DEVICE
Filed Oct. 9, 1924 3 Sheets-Sheet 2

Witness
E. H. Wagner

Inventor
John B. Borgadt
By Robt. & Robt. Hill
Attorneys

April 13, 1926.
J. B. BORGADT
1,580,401
ELECTRIC WELDING DEVICE
Filed Oct. 9, 1924     3 Sheets-Sheet 3
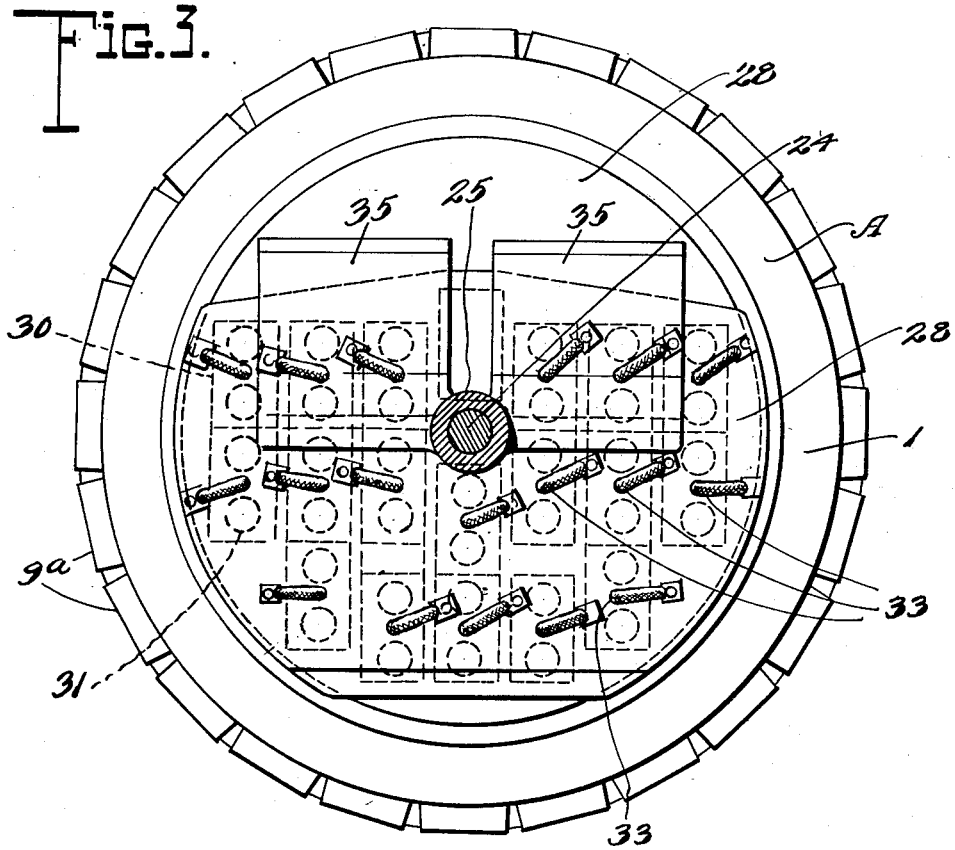
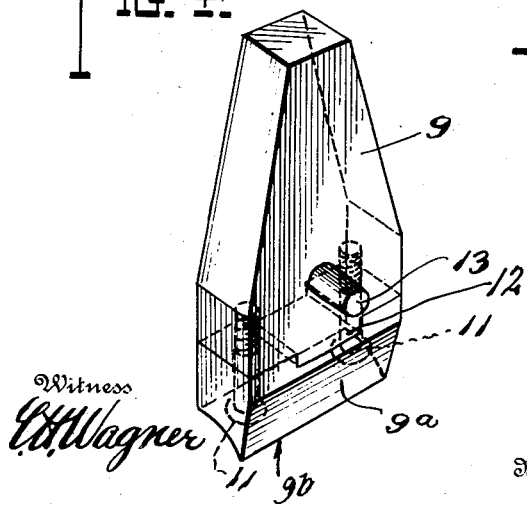
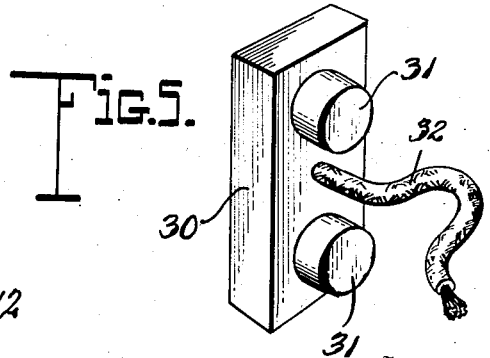
Inventor
John B. Borgadt Patented Apr. 13, 1926.

1,580,401

UNITED STATES PATENT OFFICE.

JOHN B. BORGADT, OF CLEVELAND, OHIO.

ELECTRIC WELDING DEVICE.

Application filed October 9, 1924. Serial No. 742,660.

*To all whom it may concern:*

Be it known that I, JOHN B. BORGADT, a citizen of the United States, residing at Cleveland, in the county of Cuyahoga and State of Ohio, have invented certain new and useful Improvements in Electric Welding Devices, of which the following is a specification.

The present invention relates to an electric resistance welder and has for its object to provide a device of this character which embodies novel features of construction, whereby the electric current which is utilized for heating the material to the welding temperature can be caused to pass through the material being welded without arcing and without any appreciable loss of current due to poor contacts.

Further objects of the invention are to provide an electric resistance welder in which the electrical contact with the material being welded is obtained through a series of contact shoes which engage the material over an appreciable area and which snap quickly into and out of engagement with the material so that a perfect electrical contact is always obtained and arcing is avoided.

The foregoing result is accomplished by using an electrode wheel or roller which is provided at its periphery with a series of contact shoes arranged to successively engage the material as the wheel revolves, said shoes being movable and mounted to have a quick or snap action into and out of operative position.

One particular embodiment of the invention will be shown and described in detail for illustrative purposes, although it will be understood that many modifications and changes can be made in the details of construction without departing from the spirit of the invention.

For a full understanding of the invention, reference is to be had to the following description and accompanying drawings, in which—

Figure 3 is a plan view of the inner face of one of the electrode wheels, the bearing member being shown in section.

Figure 4 is an enlarged detail perspective view of one of the contact shoes.

Figure 5 is a similar view of one of the brushes.

Corresponding and like parts are referred to in the following description and indicated on all of the views of the drawings by like reference characters.

Figure 1:
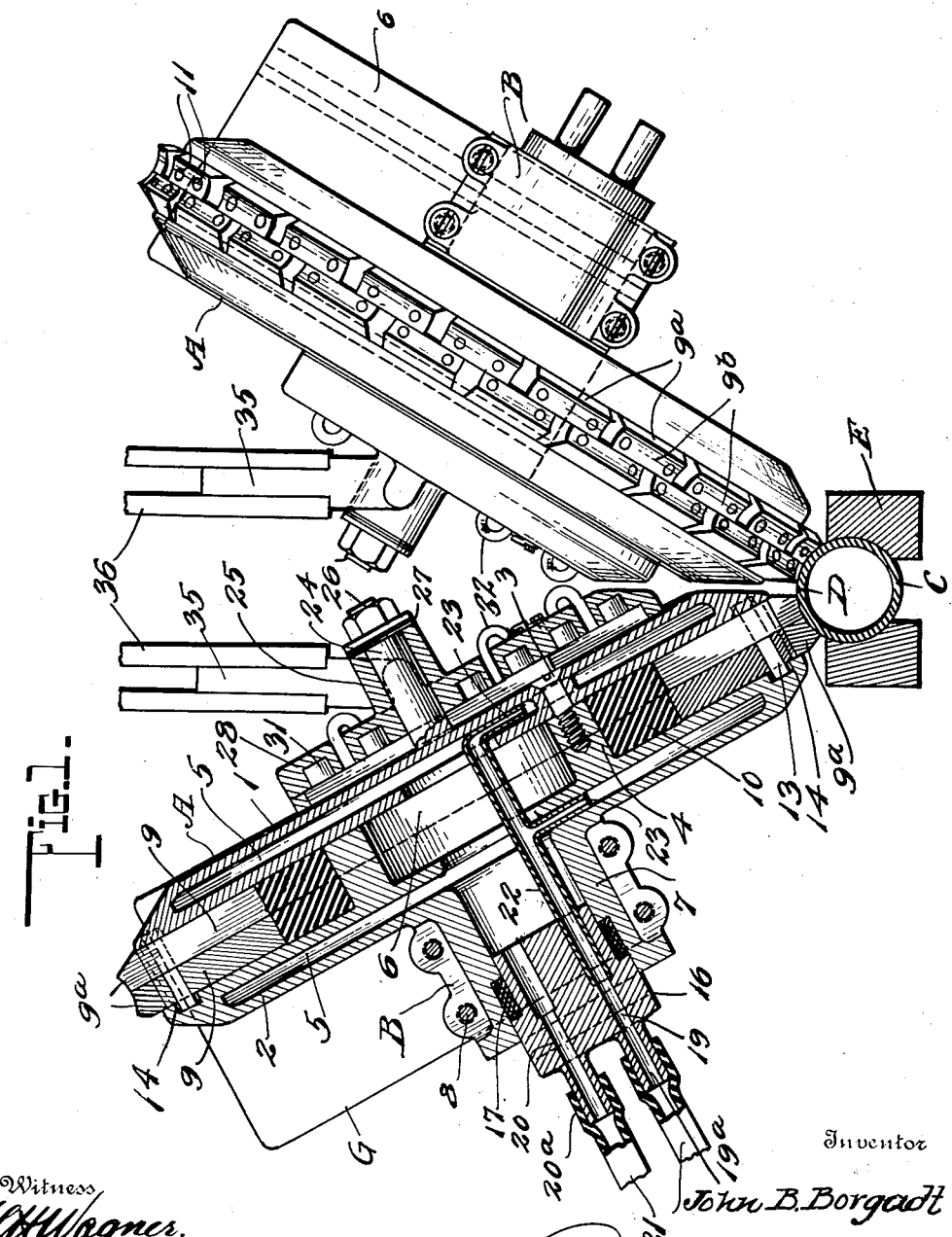
Figure 1 is a front elevation of an electric resistance welder which is constructed in accordance with the invention, one of the electrode rollers being shown in section in order to illustrate more clearly the details of construction.
Figure 2:
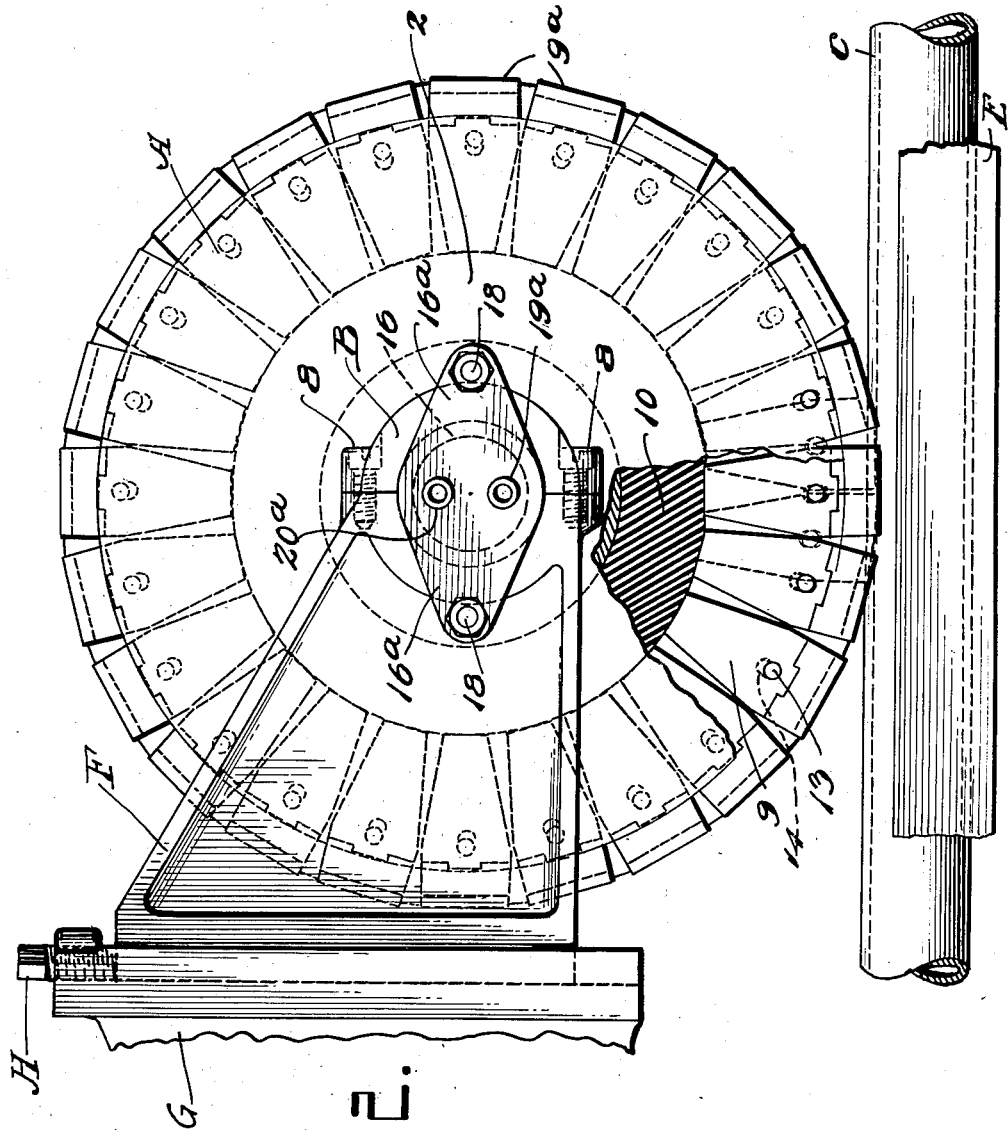
Figure 2 is a side elevation of one of the electrode wheels, a portion thereof being broken away and shown in section.

Referring to the drawings which illustrate one of many possible embodiments of the invention, the reference characters A designate a pair of electrode carrying wheels which are supported by the bearings B and arranged in cooperative relation to the work. For illustrative purposes the wheels are shown as arranged to act upon a piece of pipe or tubing C for the purpose of welding a seam D at one side thereof. The tube is intended to be advanced in the usual manner and the wheels A cause a suitable electric current to be passed across the seam D of the tube as it is advanced, whereby the opposite sides of the seam are heated to the proper temperature to be welded together. Suitable guides E are shown for supporting the tube C and any conventional means may be utilized for advancing the tube through the welding device. The electric current which is used may be suitably stepped down by means of a transformer so that it has the necessary high amperage and low voltage to heat the material of the tube to the welding temperature as it passes through the tube. The foregoing is the usual process utilized for electric seam welding by the resistance method, although the usual apparatus employs electrode wheels, each of which has a rolling contact with the tube and only contacts with the same at a point. Owing to the fact that there is only a single point of contact for each wheel, there is arcing between adjacent parts of the wheel and the tube and this arcing causes pitting and burning of the material being operated upon and the electrode wheel. This is quite a serious objection and one which has been completely avoided by my mechanism.

Referring to Figure 1 it will be seen that each of the electrode carrying wheels is formed of a pair of spaced side plates 1 and 2, said side plates being separable and the plate 1 being detachably secured by suitable fastening members such as the screws 3 to the central or body portion 4 of the wheel, said body portion being formed integral with the side plate 2. The two side plates are hollow, being formed with water circulation chambers 5 which communicate with the hollow interior 6 of the wheel and also with a hollow hub 7 which is formed in connection with the side plate 2. The hub is journaled in one of the bearings B, said bearing being divided and the halves thereof being connected by fastening members such as the screws 8. The bearing rotatably supports the electrode carrying wheel and holds the wheel in proper position during the operation of the welding device.

The peripheral portions of the side plates 1 and 2 extend beyond the central portion of the wheel and form spaced side flanges between which the electrodes 9 are mounted. The electrodes are arranged in a continuous series extending around the periphery of the wheel and the sides thereof have a sliding engagement with the inner faces of the side plates 1 and 2. The electrodes are radially disposed with respect to the wheel A, and the adjacent edges thereof taper rearwardly so that the inner ends of the electrodes are sufficiently spaced from each other to admit of the individual electrodes having an independent sidewise rocking movement.

The inner ends of the electrodes bear against a cushioning element 10 which may be formed by an annular rubber ring surrounding the body portion 4 of the wheel. In the preferred construction there are two series of the electrodes 9 extending around each electrode carrying wheel, and the electrodes 9 of each series are arranged in a staggered relation with reference to the electrodes of the other series. This is an arrangement which permits the working face of at least one of the electrodes to be in full contact with the work at all times. The outer ends or contact portions $9^a$ of the electrodes are preferably detachable and may be held in position in any suitable manner as by means of the screws or fastening members 11. If desired an interlocking joint may be formed between the electrodes and the detachable contact ends $9^a$ thereof, and, as shown on the drawings, the outer end of the body portion 9 of each electrode is formed with a central tongue 12 which engages a corresponding recess in the detachable face portion of the electrode, thereby insuring an accurate fitting of the detachable face or contact portion $9^a$ to the body portion 9. The removable outer ends or shoes $9^a$ have face portions $9^b$ which are shaped to fit accurately against the surface of the particular thing being welded. A good electrical contact is thus obtained over the entire area of the face portion $9^b$ of the shoe or electrode and this enables the electric current to be transmitted to the tube or to the article to be welded without any unnecessary heating or loss of current at the area of contact.

Each of the electrodes 9 is provided upon the outer face thereof with a laterally projecting pin 13, said pin being disposed at a point toward the outer end of the electrode and being loosely received within a recess 14 in the face of the corresponding side plate 1 or 2. The recesses 14 are radially elongated so that the electrodes or shoes can have a limited in and out radial movement, and it is intended that the rubber ring or cushioning element 10 shall act to hold the contact shoes of the electrodes in contact with the work under a considerable pressure so that there will be a good electrical connection between the contact shoes and the material being operated upon.

The contact shoes $9^a$ are tapered outwardly, and the outwardly and inwardly converging edge portions of the electrode units meet at the shoulders 15 which are at the widest portions of the units, the shoulders of adjacent electrode units being slightly spaced from each other or having a rocking contact with each other so that the electrode units can have a limited sidewise rocking movement independently of each other. It will thus be seen that each of the electrode units is mounted so that it can have a limited in and out sliding movement and also a limited sidewise rocking movement, although the cushioning ring 10 normally tends to hold the electrode unit at the outer limit of its radial movement and with the axis thereof in a radial position, so that it can rock sidewise in either direction under pressure. The body portion 9 of each of the electrode units may be formed of manganese bronze with good results, and the contact shoe $9^a$ may be formed of copper with good results. The contact shoes $9^a$ are made removable so that the electrodes can be changed and adapted for work upon different articles by using contact shoes having face portions which are so shaped that they will fit accurately against the surface of the article being welded.

The bearings B within which the hollow hub portions 7 of the electrode carrying wheels A are journaled are carried by supporting brackets F, said brackets having their rear ends slidably mounted in the guide-ways G, so that they are movable to shift the electrode carrying wheels toward and away from the tube C or other article being welded. Suitable means, such as the screws H, may be utilized for acting upon the bearing brackets to cause the electrodes to be forced against the tube or article being welded with the required pressure. For pipe seam welding it has been found that a pressure of about 200 pounds per square inch will give good results, and the use of the rubber ring or cushioning element 10 causes this pressure to be yieldably applied to the inner ends of the electrode units.

Fitted in the outer end of the hollow hub portion 7 of each of the electrode carrying wheels is a plug element 16. Packing 17 surrounds the inner end of the plug and is interposed between the plug and the hub to produce a water-tight joint. The outer end of the plug is formed with laterally projecting flange portions 16$^a$ which are secured to portions of the bracket and bearing by suitable fastening members such as the screws 18. The plug member is thus supported in position and a water tight joint is maintained between the plug member and the hollow hub, although the hub is free to rotate in the necessary manner.

Extending through the plug are passages 19 and 20, said passages communicating with the respective nipples 19$^a$ and 20$^a$ which project from the outer end of the plug. Lengths of hose 21 may be fitted upon the nipples to provide for a circulation of water through the passages of the plug. A circulation pipe 22 is carried by the plug 16 and has one end thereof fitted in the inlet passage 20 thereof. This pipe 22 extends through the hollow central portion of the electrode carrying wheel and is provided with the lateral nozzles 23 which project into the outer circulation chambers 5 of the respective side plates 1 and 2. Any suitable means may be provided for pumping or forcing the water through the inlet passage 19 of the plug and this water will be carried by the pipe 22 and nozzles 23 to the water chambers in the side plates of the wheel. After circulating through these side plates the water can be permitted to flow out through the outlet passage 20 and this circulation of water through the wheel will tend to keep the wheel cool at all times, thereby enabling the welding device to be used continuously and avoiding the possibility that the device will be temporarily disabled by overheating.

The side plate 1 of each of the electrode carrying wheels is formed with a stub shaft 24 upon which a sleeve 25 is fitted, said sleeve being held in position by a nut 26 and washers 27. The sleeve 25 is formed as part of a brush carrying plate 28 and the inner face of the said plate is formed with a series of recesses 29 within which the contact blocks or brushes 30 are fitted. Yielding means such as springs or pieces of rubber 31 are arranged back of each of the brushes 30, suitable pockets being formed in the plate 28, and the brushes 30 are thus caused to press yieldably against the face of the electrode carrying wheel. A considerable number of these brushes is employed, each brush being comparatively large and the aggregate contact area of all of the brushes is considerable, thereby providing for transmission of the electric current to and from the electrode carrying wheels with a minimum loss and with a minimum amount of heating. In order to insure a good electrical connection between the brushes 30 and the plate 28, each of the brushes has a flexible wire or pigtail 32 brazed or otherwise permanently attached thereto. The pigtails are carried outwardly through openings 33 in the plate 28, and have their outer ends suitably secured to the brush carrying plate 28 by means of fastening elements 34. This arrangement makes it certain that each and every one of the individual brushes 30 will at all times have a perfect electrical connection with the respective brush carrying plate 28.

The brush carrying plates are formed with upwardly conducting arms 35 which telescope within guideways 36 formed of conducting material. The engagement of the conductor arms 35 with the guideways 36 holds the respective brush carrying plates 28 against rotation, and the telescoping connection between the conductor arms 35 and the guideways 36 enables the electrode carrying wheels to have the necessary limited movement toward and from the tube or other article being welded.

When the device is to be utilized for seam welding on tubes or pipes, the two electrode carrying wheels A will be arranged in a substantially V-shaped relation, as shown by Fig. 1. the two wheels being spaced from each other and the contact shoes 9$^a$ at the peripheries thereof engaging the tube or pipe C on opposite sides of the seam D. The bearing brackets will be adjusted so that the contact shoes 9$^a$ will bear against the tube or pipe C with the desired amount of pressure, it having been found, as previously stated, that good results are obtainable with a pressure of about 300 pounds per square inch. As the pipe or tube C is slowly advanced, any suitable mechanism being utilized for this purpose, the electrode carrying wheels will be revolved by a frictional engagement with the tube. If the current is switched on there will be a flow of electricity through the wheels and across the seam D of the tube, whereby the edges of the seam will be heated to the proper temperature for welding together. As the wheels revolve the contact shoes 9$^a$ of the various electrodes are brought successively into engagement with the tube C and the face portion of each contact shoe has such a contour that it will fit snugly against the tube while it is in engagement therewith. Owing to the fact that the entire face of the contact shoe is in engagement with the tube there is a considerable contact area between the tube and the electrode carrying wheel, so that the current can be transmitted to the tube without arcing and undue heating. It will also be remembered that each of the wheels A is provided with two rows of the electrodes and that the electrodes of each row are in a staggered relation with respect to the electrodes of the other row. Each of the electrodes will be forced inwardly against the pressure of the rubber ring or cushioning element 10 when the contact shoe thereof is brought into engagement with the tube C, and the action of the cushioning element will hold the contact shoe forcibly against the tube with a heavy pressure. The sidewise rocking movement of the electrode will permit the contact shoe to remain in an intimate engagement with the tube for an interval of time, although this sidewise rocking movement of the electrode results in deforming the rubber ring or cushioning element 10 and producing stresses therein, with the result that after a certain period of movement with the contact shoe in intimate engagement with the tube the contact shoe will be suddenly rocked out of engagement with the tube. In other words, the contact shoes have a quick movement or snap action as they are moved into and out of contact with the tube, and owing to the fact that the electrodes of the two rows are in a staggered relation to each other there will always be at least one of the contact shoes in full engagement with the tube. A broad contact area is thus maintained at all times between the electrode carrying wheels and the tube, and this is an improvement over the conventional electrode wheel which has only a rolling contact with the tube or pipe with such an insufficient contact area as to cause arcing and burning or pitting of the work. The wheels are water cooled so that overheating is rendered impossible and the electric current is transmitted to and from the wheels through an adequate number of brushes which directly engage the wheels instead of through the hub and bearing in the usual manner, the latter being objectionable for the reason that it results in undue heating and quick wearing at the hub. The arrangement is such that a current having the necessary high amperage and low voltage can be conveyed to and from the article being welded with a minimum loss and without undue heating. The bearings serve only to support the wheels and no current is carried through them. While the particular form of the invention which has been illustrated is intended to be used for the purpose of seam welding a tube or pipe, it will be understood that with simple and obvious changes the device can be arranged for operating upon any desired articles to produce a welded joint by electrical resistance welding.

Having thus described my invention what I claim as new and desire to secure by Letters Patent is,

1. In an electric resistance welder, a series of independent electrodes, a carrier upon which the electrodes are mounted for bringing the electrodes successively into operative engagement with the material being welded and yielding means acting upon the electrodes to move them into and out of operative position with a snap action.

2. In an electric resistance welder, a series of independent electrodes, a carrier, means for mounting the electrodes upon the carrier so that they are movable relative thereto in the direction in which the carrier moves, the carrier serving to bring the movably mounted electrodes successively into engagement with the material being welded and yielding means acting upon the electrodes to hold them in engagement with the work.

3. In an electric resistance welder, a carrier, and a series of electrodes rockably mounted upon the carrier, the electrodes being brought successively into operative engagement with the material being welded by the movements of the carrier and yielding means for moving the electrodes into and out of operative position with a snap action.

4. In an electric resistance welder, a carrier, a series of electrodes mounted upon the carrier and having both a rocking movement relative thereto and an in-and-out movement, said electrodes being brought successively into engagement with the material being welded by the movements of the carrier, and yielding means acting upon the electrodes for producing a snap action as they are engaged and disengaged from the material being welded.

5. In an electric resistance welder, a carrier, a series of independent electrodes mounted upon the carrier so that they are brought successively into operative position thereby, said electrodes each having a contact face conforming to the shape of the material to be engaged thereby, so that it will engage the material over the entire area of the face, and yielding means for producing a snap action of the electrodes as they are successively brought into and out of operative position.

6. In an electric resistance welder, a rotary carrier, a series of electrodes extending around the periphery of the carrier, each of the electrods being rockably mounted and having a contact face conforming to the shape of the member to be engaged thereby and adapted to engage the said member over the entire area thereof, and yielding means acting upon the electrodes for causing them to be moved into and out of operative position with a snap action as they are brought successively into operative position by the rotation of the carrier.

7. In an electric resistance welder, a rotary carrier, a series of electrodes extending around the periphery of the carrier and each mounted to have an in-and-out movement and a rocking movement, each of the electrodes having a contact face conforming to the contour of the member to be engaged thereby and adapted to engage the member over its entire face, and yielding means acting upon the electrodes for causing them to engage and disengage the article with a snap action as they are brought successively into operative position by the rotation of the carrier.

8. In an electric resistance welder, a rotary carrier, a plurality of series of electrodes extending around the periphery of the carrier and having the independent electrodes thereof arranged in staggered relations and mounted for independent movement, and yielding means acting upon the electrodes to force them into engagement with the work as they are brought successively into engagement therewith by the rotation of the carrier, the electrodes of the different series overlapping each other so that one pair of electrodes is always in engagement with the work and a continuous and uniform seam is welded.

9. In an electric resistance welder, a rotary carrier, a plurality of series of electrodes extending around the periphery of the carrier and arranged in staggered relations, said electrodes being rockably mounted and formed with contact faces, and yielding means acting upon the electrodes for moving the contact faces into and out of engagement with the work with a snap action as they are brought successively into operative position by the rotation of the carrier.

10. In an electric resistance welder, an electrode carrying wheel formed with spaced side plates, and a series of independent electrodes loosely mounted between the side plates and arranged to be brought successively into operative position as the wheel is rotated.

11. In an electric resistance welder, an electrode carrying wheel formed with spaced side plates, a series of independent electrodes loosely received between the side plates, and a cushioning element applied to the wheel and engaging the inner ends of the electrodes, said electrodes being arranged to be brought successively into operative position as the wheel is rotated.

12. In an electric resistance welder, an electrode carrying wheel formed with spaced side plates, a series of independent electrodes loosely mounted between the side plates, and a rubber cushioning ring applied to the wheel and engaging the inner ends of the electrodes, said electrodes being arranged to be brought successively into operative position as the wheel is rotated.

13. In an electric resistance welder, an electrode carrying wheel formed with spaced side plates, a series of independent electrodes loosely received between the side plates so as to slide radially and rock in the plane of the wheel, said electrodes having contact faces of appreciable area, and cushioning and yielding means acting on the inner ends of the electrodes whereby they snap into and out of engagement with the member being welded as they are brought successively into operative position by the rotation of the wheel.

14. In an electric resistance welder, an electrode carrying wheel formed with spaced side plates, two series of independent electrodes mounted between the side plates and arranged in a staggered relation, said electrodes having contact faces of an appreciable area and being mounted to slide radially and rock laterally in the plane of the wheel, and a resilient ring applied to the wheel and engaging the inner ends of the electrodes whereby the latter are caused to snap in and out of engagement with the member being welded as they are brought successively into operative position by the rotation of the wheel.

15. In an electric resistance welder, an electrode carrying wheel formed with spaced side plates, a series of independent electrodes loosely received within the side plates so as to slide radially, said electrodes having the edges thereof tapered inwardly and outwardly so that each electrode can have a limited rocking movement in the plane of the wheel, the outer end of the electrode being formed with a contact face of appreciable area, and yielding means engaging the inner ends of the electrodes.

16. In an electric resistance welder, an electrode carrying wheel formed with spaced side plates having recesses in the inner faces thereof, a series of independent electrodes loosely received between the side plates and formed with lateral pins fitting loosely within the recesses of the side plates, and yielding means engaging the electrodes for holding them in proper engagement with the work.

17. In an electric resistance welder, a hollow electrode carrying wheel, and means for circulating a cooling medium through the said electrode carrying wheel including a nozzle for directing the cooling medium toward the operative side of the wheel.

18. In an electric resistance welder, a hollow electrode carrying wheel, and means for circulating a cooling medium through said electrode carrying wheel including a plurality of nozzles for directing the cooling medium toward the operative portion of the periphery of the wheel.

19. In an electric resistance welder, an electrode wheel including electrodes, a hollow side plate extending along the sides of the electrodes and in contact therewith, and means for circulating a cooling medium through the hollow side plate.

20. In an electric resistance welder, an electrode wheel, means upon one side of the wheel for rotatably supporting the same, the opposite side thereof being flat and free from any supporting means, a brush carrying plate arranged on the said flat side of the wheel and a series of brushes mounted upon the plate and slidably engaging the said flat face of the wheel over a considerable portion of the area thereof.

21. In an electric resistance welder, an electrode wheel, means on one side of the wheel for rotatably supporting the same, the opposite side of the wheel being flat and free from supporting means, a brush carrying plate arranged on the said flat side of the wheel, means for obtaining a pivotal connection between the brush carrying plate and the wheel, means for holding the brush carrying plate against rotation with the wheel, and a plurality of brushes mounted upon the plate and slidably engaging the flat face of the wheel over a considerable portion of the area thereof.

22. In an electric resistance welder, an electrode wheel having a flat face, a shaft projecting from the flat face of the wheel, a sleeve loose on the shaft, a brush carrying plate mounted upon the sleeve and arranged opposite the flat face of the wheel, means for holding the plate against rotation, and a series of brushes mounted upon the plate and slidably engaging the flat face of the wheel over a considerable portion of the area thereof.

23. In an electric resistance welder, an electrode wheel, a shaft projecting from one side thereof, a sleeve loose upon the shaft, a brush carrying plate mounted upon the sleeve, a plurality of brushes carried by the brush carrying plate and slidably engaging a side of the wheel over a considerable portion of the area thereof, and means for holding the brush carrying plate against rotation with the wheel.

24. In an electric resistance welder, an electrode wheel, means on one side of the wheel for rotatably supporting the same, the wheel being entirely supported by the said means and free from support on the opposite side, a stub shaft projecting from the said opposite side of the wheel, a brush carrying plate provided with means for engaging the stub shaft, whereby it is supported by and centred on the wheel, means for holding the plate against rotation with the wheel, and a plurality of brushes carried by the said plate and engaging the side of the wheel over a considerable portion of the area thereof.

In testimony whereof I affix my signature.

JOHN B. BORGADT.